United States Patent [19]
Schaefer

[11] 3,740,002
[45] June 19, 1973

[54] INTERFEROMETER TYPE HOMING HEAD FOR GUIDED MISSILES
[75] Inventor: Jacob W. Schaefer, Watchung, N.J.
[73] Assignee: The United States of America as represented by the Secretary of the Army
[22] Filed: Nov. 23, 1966
[21] Appl. No.: 596,736

[52] U.S. Cl............ 244/3.19, 244/77 B, 343/117 A
[51] Int. Cl.............................................. G01s 3/42
[58] Field of Search...................... 343/117, 117 A; 244/3.19, 77 B

[56] References Cited
UNITED STATES PATENTS
3,202,992  8/1965  Kent et al. ................... 343/117 A X
3,243,145  3/1966  Simon et al. ....................... 244/3.19

OTHER PUBLICATIONS
Sommer, Howard H., I.R.E. Transactions on Aeronautical and Navigational Electronics, Vol. ANE-3, No. 2, June, 1956, pp. 67-70.

Primary Examiner—Benjamin A. Borchelt
Assistant Examiner—Richard E. Berger
Attorney—Harry M. Saragovitz, Edward J. Kelly, Herbert Berl and Robert C. Sims

[57]  ABSTRACT

Two detecting systems are used to generate yaw and pitch error signals for obtaining a collision course with a target, and the systems are interconnected to exchange information.

6 Claims, 3 Drawing Figures

Jacob W. Schaefer,
INVENTOR.

INTERFEROMETER TYPE HOMING HEAD FOR GUIDED MISSILES

The use of a homing head will increase the effectiveness of most of the intercept missiles. A homing head will also incrase a system's effectiveness against formations of targets, and it will increase the probability of kill against single targets at very long ranges. However, there is often a limited amount of space available for a homing head. Therefore, there is need for a homer which has a very simple antenna system so as to permit it to be placed in the nose compartment of a small missile. The system will have to be able to detect and track targets up to 45° off the nose of the missile.

It is an object of the invention to provide an interferometer type homing head for use in missiles.

It is a further object of the present invention to provide homing head which has a simple compact antenna system.

A still further object of this invention is the provision of a homing system which uses proportional navigation with respect to its own axis.

The invention further resides in and is characterized by various novel features of construction, combinations, and arrangements of parts which are pointed out with particularity in the claims annexed to and forming a part of this specification. Complete understanding of the invention and an introduction to other objects and features not specifically mentioned will be apparent to those skilled in the art to which it pertains when reference is made to the following detailed description of a specific embodiment thereof and read in conjunction with the appended drawing. The drawing, which forms a part of the specification, presents the same reference characters to represent corresponding and like parts throughout the drawing, and wherein:

Nearly all homing heads operate on the principle of proportional navigation. This term is used to describe a system that measures the direction of the target, in earth's coordinates, and steers the missile in a manner to keep that direction constant. If this criteria is realized in both steering coordinates the missile is on a collision course, and the direction of the tqrget remains unchanged until intercept. One difficulty arises from the fact that the direction of the target must be measured irrespective of missile attitude changes. This can be accomplished by placing the homing head on a stabilized platform. Real target motion can also be obtained by subtracting missile body motions from the observed target motion. An interferometer type homer utilizes the latter technique. However, the interferometer will employ an approximate manner of subtracting missile motion from the observed target position. This is a cause of considerable concern as it is a source of instability in the steering loop. An approximate solution would be especially detrimental in a system where the angle of attack per unit of acceleration is relatively large. This would mean that relatively large missile motions would have to be subtracted and the corrections would have to be much more exact if instability is to be avoided. The homing device of the present invention provides a complete solution for the missile motion problem and will eliminate it as a cause of instability.

Figure 1:
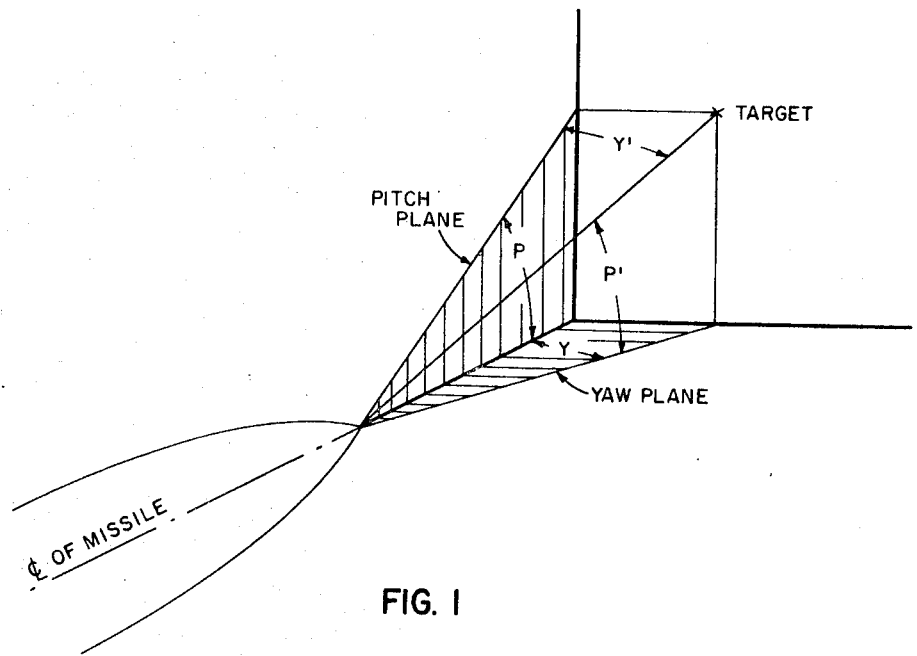
FIG. 1 illustrates the geometry for a homing solution of the present invention.

FIG. 1 is a diagram that illustrates the geometry of the problem. A set of rectangular coordinate axes is illustrated, one of which is along the center line of the missile structure. The other two axes are determined by the location of the antenna pairs. These cause the other two axes to be in the yaw and pitch planes. The interferometer type device of this invention will measure the angles in the slant planes containing the target and a pair of the antennas of the interferometer. In the case of the solution for the yaw plane, the angle is $Y'$. However, the guidance of the missile is steered in the plane containing the angle $Y$. The same is true for the slant angle $P'$ and the pitch angle $P$. The relationships of these angles is shown in the following equations:

$$\tan Y'/\tan Y = \cos P \tag{1}$$

$$\tan Y = \sec P \tan Y' \tag{2}$$

$$\tan P'/\tan P = \cos Y \tag{3}$$

$$\tan P = \sec Y \tan P' \tag{4}$$

Figure 2:
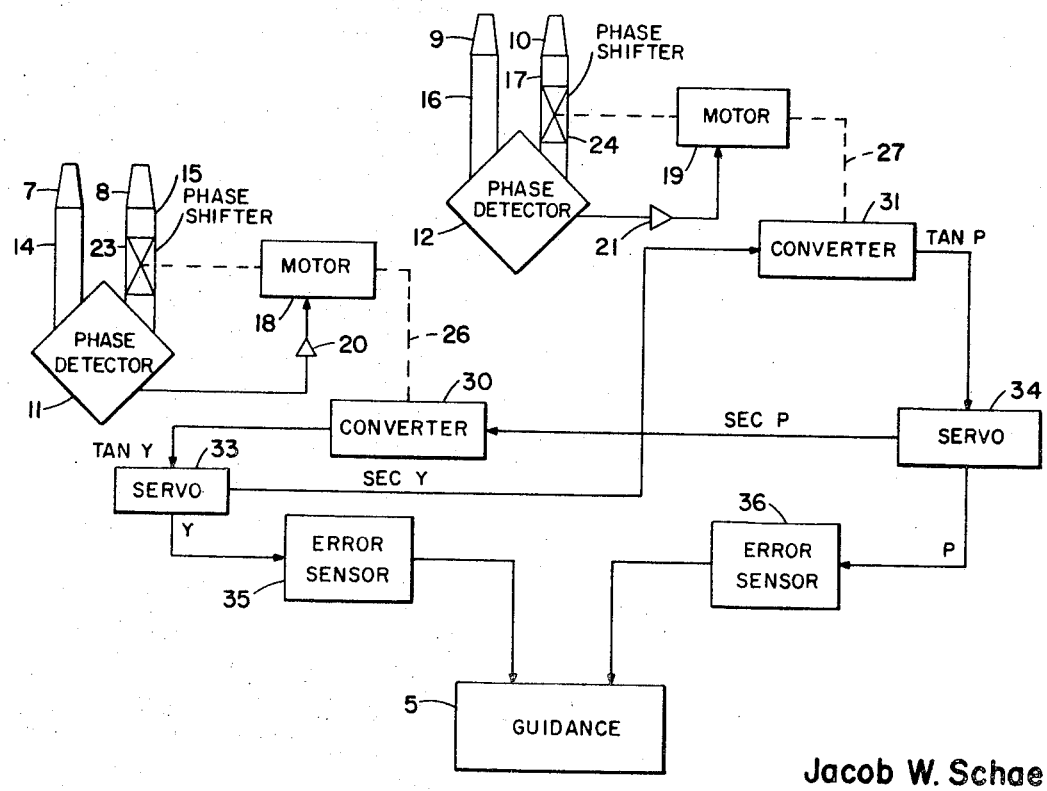
FIG. 2 illustrates in block diagram the overall system of a preferred form of the invention.

FIG. 2 shows a block diagram of the equipment necessary to obtain $Y'$ and $P'$ and solve the equations to produce error indications to guidance 5. Two pair of antennas 7 and 8, and 9 and 10 are used to determine the position of the target. The pair 7 and 8 are aligned in the yaw plane while the pair 9 and 10 are aligned in the pitch plane. Three antennas may be used where one of the antennas (for example 7) will be used in both the yaw and the pitch plane. Phase detectors 11 and 12 are provided at the junctions of the pairs of wave guides 14 and 15, and 16 and 17. The outputs of the phase detectors are used to drive servo motors 18 and 19 by way of amplifiers 20 and 21. The motors 18 and 19 in turn drive phase shifters 23 and 24 so as to null the phase difference at the detectors. The shaft 26 position of motor 18 is proportional to $\sin Y'$, and the shaft 27 position of motor 19 is proprotional to $\sin P'$. These positions are converted by converter means including converters 30 and 31 to outputs which represent $\tan Y$ and $\tan P$. However, in order for converters 30 and 31 to properly operate they must have as inputs the sec P and the sec Y respectively. This is obtained by servo units 33 and 34 in the converter means. The servo units which convert their inputs to sec Y and sec P respectively. Servos 33 and 34 also have outputs of Y and P which are fed through error sensors 35 and 36 to the guidance 5 for steering of the missile. Error sensors 35 and 36 may each be made up of differentiator 45, amplifier 47, and rate gyro 49 connected as shown in FIG. 3.

Figure 3:
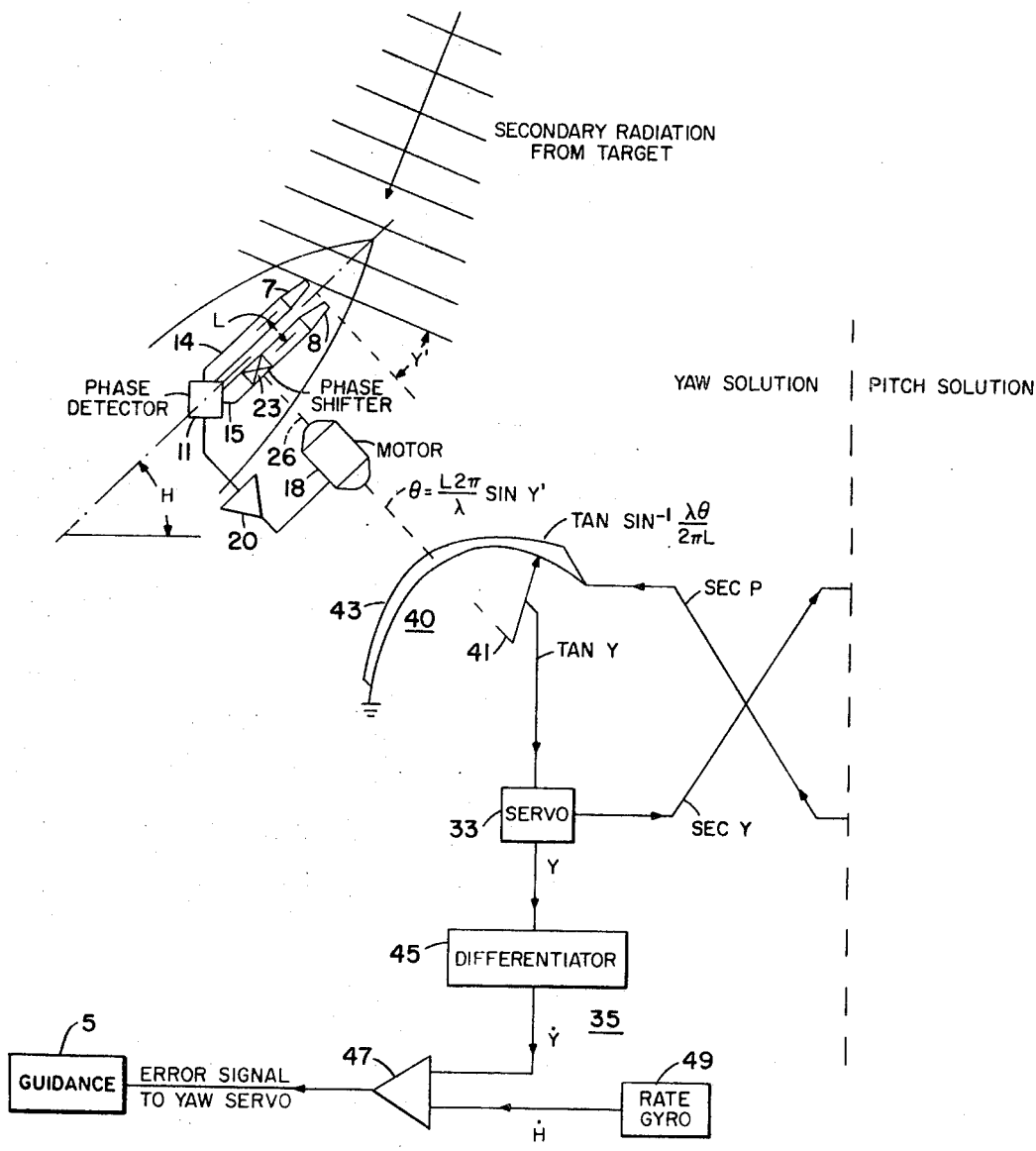
FIG. 3 illustrates in greater detail the yaw solution structure of the invention.

FIG. 3 shows the solution of the yaw equations in greater detail. The detail of the pitch equipment is identical to that of the yaw equipment, except for being 90° different in the phase placement. As can be seen from FIG. 3 the received radiation from a target will arrive at different times on antennas 7 and 8. This difference in time is proportional to $Y'$ and can be determined by the difference in the phase of the signals received by the antennas. A phase detector 11 provides an error output signal to amplifier 20 which drives a servo motor 18 which in turn positions a phase shifter in the wave guide 15 of antenna 8. This loop will find a null and the position $\phi$ of the shaft 26 of motor 18, and $\phi$ will be a measure of the relative phase difference of the received signals on antennas 7 and 8. The relationship of the shaft position $\phi$ and Y' is $$\phi = 2\pi L/\lambda) \sin Y'$$

where
$\phi$ = shaft position
$\lambda$ = wave length of radiation
$L$ = distance between antennas.

Equation (5) must be manipulated to extract tan Y' for use in equation (2).

$$\sin Y' = \lambda \phi/2 \pi L$$
$$Y' = \sin^{-1} (\lambda \phi/2 \pi L)$$
$$\tan Y' = \sin^{-1} (\lambda \phi/2 \pi L)$$

substituting in equation (2), $$\tan Y = \sec P [\tan \sin^{-1} (\lambda \phi/2 \pi L)]$$

(6)

From equation (6) it can be seen that a voltage proportional to tan Y can be developed by a potentiometer if the shaft rotation is $\phi$, the card shape is the function of tan sin$^{-1}$ ($\lambda \phi/2 \pi L$), and the card is supplied by a voltage proportional to sec P. This situation is provided in FIG. 3 by the potentiometer 40 which has its shaft rotated by the motor 18, has a card shape 43 in accordance to the above function, and is supplied by a voltage proportional to sec P from the pitch solution. Therefore, the output of potentiometer 40 is proportional to tan Y. This is fed to a computing type of servo 33 which has outputs of Y and sec Y. This computing type of servo could be of the meter movement type.

The output sec Y of servo 33 is sent to supply the potentiometer in the pitch solution. The output Y of servo 33 is sent through a differentiator 45 so as to get the change in yaw direction of target $\dot{Y}$. This is sent through amplifier 47 where the change in the missile's yaw $\dot{H}$ is subtracted therefrom. The output of the amplifier is sent to the yaw servo control for providing any needed correction to the missile's yaw direction. Rate gyro 49 provides the signal for the change in the missile's yaw. This will be an absolute value as it is only related to the missile itself and not to the target or ground.

When the same is done for the pitch of the missile, then the guidance of the missile will keep the yaw and pitch directions of the target constant. This will cause the missile and the target to be on collision courses. The missile could contain a warhead which could be exploded upon command, contact, proximity, etc. The target could be illuminated from the ground, by a transmitter within the missile, by the target's jamming system, etc.

Variations in frequency of the secondary radiation from the target will cause errors in the target angular rate solution due to the change in the wave length $\lambda$ in the equations. Errors of this sort will not effect the accuracy of indicating when a true collision course has been attained. However, they will affect over-all loop stability by degrading the compensation for transient effects of body motion. Fortunately, this affect can be nullified automatically by the phase shifters. If one of the more common types of phase shifter is used, then it will operate on a delay principle instead of causing a specific angular effect. The resulting angular dealy, therefore, is proportional to frequency, and will tend to automatically compensate for any change in wave length.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. It will be apparent to those skilled in the art that changes may be made in the form of the apparatus disclosed without departing from the spirit of the invention as set forth in the disclosure, and that in some cases certain features of the invention may sometimes be used to advantage without a corresponding use of other features. It is, therefore, to be understood that within the scope of the appended claims, the invention may be practiced otherwise than as specifically described. Accordingly, it is desired that the scope of the invention be limited only by the appended claims.

I claim:

1. In a carrier means, a guidance system comprising a guidance means, first and second detecting means, each of the detecting systems having first and second radiation detectors, respectively having inputs for detecting a radiation and outputs which are measures of the radiation as received at their inputs, phase detecting means respectively connected to the outputs of said radiation detectors, converter means connected to outputs of each phase detecting means for converting phase differences between the outputs of the respective first and second detectors into measures of the directions of the detected radiation relative to the radiation detectors, sensing means connected to outputs of said converter means for sensing changes of the directions of the radiations relative to the radiation detectors, the converter means of each of the detecting systems being interconnected with each other to exchange information, said carrier means containing said guidance means, and said guidance means being connected to outputs of said sensing means for guiding said carrier means in a direction such that no change will be sensed by said sensing means.

2. A guidance system as in claim 1 wherein adjustable phase shifters are connected between corresponding radiation detectors and said phase detectors, and positioning means are respectively connected to said phase detectors and disposed to operate said phase shifters and converters to provide similar phase relations between the outputs of the rspective detecting systems.

3. A guidance system as set forth in claim 1, wherein said carrier means is a missile, said first detecting system having its detectors aligned to respond to changes in the yaw direction of the radiation, and said second detecting system having its detectors aligned to respond to changes in the pitch direction of the radiation.

4. A guidance system as set forth in claim 1, wherein each of said converter means comprises a potentiometer means having a movable arm positioned by a positioning means and a card which has a predetermined function, connections from said movable arm to a servo converter, each servo converter having two outputs, one connected to an input of the card of the potentiometer of the other detecting system, and the other output connected to the sensing means.

5. A guidance system as set forth in claim 4, wherein said carrier means is a missile, said first detecting system having its detectors aligned to respond to changes in the yaw direction of the radiation, and said second detecting system having its detectors aligned to respond to changes in the pitch direction of the radiation.

6. A guidance system as set forth in claim 5, wherein said sensing means each contain a differentiator connected to the output of the servo converter, a rate gyro, and a combining means having inputs connected to outputs of the differentiator and the rate gyro; and said combining means having an output connected to said guidance means.

* * * * *